(12) United States Patent
Ohachi et al.

(10) Patent No.: US 10,137,853 B2
(45) Date of Patent: Nov. 27, 2018

(54) VEHICLE AIRBAG DEVICE AND VEHICLE OCCUPANT RESTRAINT DEVICE

(71) Applicant: TOYOTA JIDOSHA KABUSHIKI KAISHA, Aichi-ken (JP)

(72) Inventors: Jiro Ohachi, Shizuoka-ken (JP); Kai Maenishi, Gotenba (JP)

(73) Assignee: TOYOTA JIDOSHA KABUSHIKI, Aichi-ken (JP)

( * ) Notice: Subject to any disclaimer, the term of this patent is extended or adjusted under 35 U.S.C. 154(b) by 0 days.

(21) Appl. No.: 15/614,728

(22) Filed: Jun. 6, 2017

(65) Prior Publication Data

US 2017/0361800 A1 Dec. 21, 2017

(30) Foreign Application Priority Data

Jun. 17, 2016 (JP) ................................. 2016-121198

(51) Int. Cl.
*B60R 21/207* (2006.01)
*B60R 21/231* (2011.01)
*B60R 21/20* (2011.01)

(52) U.S. Cl.
CPC .......... *B60R 21/207* (2013.01); *B60R 21/231* (2013.01); *B60R 21/20* (2013.01); *B60R 2021/23153* (2013.01)

(58) Field of Classification Search
CPC ................ B60R 21/207; B60R 21/231; B60R 2021/23153; B60R 21/20
See application file for complete search history.

(56) References Cited

U.S. PATENT DOCUMENTS

| 3,618,979 | A | * | 11/1971 | Gulette | ................. | B60R 21/231 |
| | | | | | | 280/731 |
| 6,536,801 | B2 | * | 3/2003 | Frisch | ................. | B60R 21/2165 |
| | | | | | | 280/728.2 |

(Continued)

FOREIGN PATENT DOCUMENTS

| JP | 51-31581 B2 | 9/1976 |
| JP | 2008-279977 A | 11/2008 |

(Continued)

OTHER PUBLICATIONS

ZF TRW [retrieved on May 13, 2016]. Retrieved from the Internet:<URL: http://trwauto.co.jp/occupant_safety_systems/innovations>, 2 pgs.

(Continued)

*Primary Examiner* — Darlene P Condra
(74) *Attorney, Agent, or Firm* — Hauptman Ham LLP

(57) ABSTRACT

A vehicle airbag device comprises an airbag that receives gas supplied from an inflator and that is adapted to be inflated and deployed in front of an upper body and above thighs of an occupant seated in a vehicle seat. The airbag includes, in the event that the gas has been supplied inside the airbag and the airbag inflates and deploys, an inflation section having an endless annular shape as viewed along a vehicle width direction, and a hollow section formed in a central portion of the inflation section. The hollow section is in communication with an exterior of the airbag, and air at the exterior flows into the hollow section during inflation and deployment.

10 Claims, 15 Drawing Sheets

(56) References Cited

U.S. PATENT DOCUMENTS

| | | | |
|---|---|---|---|
| 6,561,538 B2* | 5/2003 | Ford | B60R 21/2035 280/728.2 |
| 7,637,528 B2* | 12/2009 | Shimazaki | B60Q 5/003 280/728.2 |
| 9,533,651 B1* | 1/2017 | Ohno | B60R 21/23138 |
| 2004/0160039 A1* | 8/2004 | Heist | B60R 21/203 280/728.2 |
| 2009/0295131 A1* | 12/2009 | Kim | B60R 21/214 280/730.1 |
| 2011/0042922 A1* | 2/2011 | Miyata | B60R 21/233 280/730.1 |
| 2011/0062688 A1* | 3/2011 | Hayashi | B60R 21/21656 280/728.3 |

FOREIGN PATENT DOCUMENTS

| | | |
|---|---|---|
| JP | 2014-237382 A | 12/2014 |
| JP | 2016-30545 A | 3/2016 |

OTHER PUBLICATIONS

"TRW Announces a Small Size Inflator for a Curtain Airbag and an Airbag System for a Rear Seat", Auto Prove, Dec. 18, 2014. [retrieved on Jan. 23, 2017]. Retrieved from the Internet:<URL: http://autoprove.net/2014/12/54784.html>, 4 pgs.

Hu, Jingwen. "Rear-seat Occupant Protection: Considering the Needs from a Diverse Population", SAE Government/Industry Meeting, Jan. 22, 2016, University of Michigan Transportation Research Institute, 34 pgs.

* cited by examiner

VEHICLE AIRBAG DEVICE AND VEHICLE OCCUPANT RESTRAINT DEVICE

CROSS-REFERENCE TO RELATED APPLICATION

This application claims priority under 35 USC 119 from Japanese Patent Application, No. 2016-121198 filed Jun. 17, 2016, the disclosure of which is incorporated by reference herein in its entirety.

BACKGROUND

Technical Field

Preferred embodiments relate to a vehicle airbag device, and a vehicle occupant restraint device including the vehicle airbag device.

Related Art

A rear seat occupant restraint device described in Japanese Patent Application Laid-Open (JP-A) No. 2008-279977 includes an airbag that is inbuilt in a rear side door, a side door, or a center pillar, and that is inflated and deployed between a rear seat occupant and a front seat. The airbag restrains the rear seat occupant while bearing reaction force from a seatback of the front seat. This enables contact between the rear seat occupant and interior components such as a headrest or the seatback of the front seat, as well as the center pillar, to be prevented.

SUMMARY

However, in the rear seat occupant restraint device with the above configuration, a distance between the seatback of the front seat and the rear seat occupant changes depending on adjustment of a front-rear slide position of the front seat and depending on adjustment of an angle of incline of the seatback.

Thus, for example, when the airbag is inflated and deployed in a state in which there is a short distance between the seatback of the front seat and the rear seat occupant, there is a possibility that the rear seat occupant might bear an excessive load from the airbag.

In consideration of the above circumstances, an object of preferred embodiments is to provide, in configurations in which an airbag is inflated and deployed in front of an occupant seated in a vehicle seat, a vehicle airbag device capable of preventing or suppressing an excessive load from the airbag being borne by the occupant, even in cases in which there is a short distance between the occupant and an interior component positioned in front of the occupant.

A vehicle airbag device of the first aspect of the disclosure includes: an airbag that receives gas supplied from an inflator and that is adapted to be inflated and deployed in front of an upper body and above thighs of an occupant seated in a vehicle seat; the airbag including, in the event that the gas has been supplied inside the airbag and the airbag inflates and deploys, an inflation section having an endless annular shape as viewed along a vehicle width direction, and a hollow section formed in a central portion of the inflation section; the hollow section being in communication with an exterior of the airbag; and air at the exterior flowing into the hollow section during inflation and deployment.

In the first aspect, when the vehicle is in a front-end collision, for example, the airbag is inflated and deployed in front of the upper body and above the thighs of the occupant seated in the vehicle seat on receiving gas supplied from the inflator. The airbag includes the inflation section that is inflated and deployed on being supplied with gas into its interior and that forms an endless annular shape as viewed along the vehicle width direction. The hollow section formed in the central portion of the inflated and deployed inflation section as viewed along the vehicle width direction is in communication with the airbag exterior. Air at the airbag exterior flows into the hollow section during inflation and deployment.

Note that when there is a short distance between the occupant and an interior component (such as a seatback of another vehicle seat) positioned in front of the occupant, for example, the airbag that is inflated and deployed between the interior component and the upper body of the occupant is compressed in the vehicle front-rear direction. The hollow section is squashed in the vehicle front-rear direction while discharging air from its interior when this occurs, such that the inflation section is bent in one or plural locations in the circumferential direction while retaining its internal pressure, and a vehicle front-rear direction dimension of the airbag when inflation and deployment is complete is reduced. This enables excessive load from the airbag to be prevented from being borne by the occupant.

A vehicle airbag device of a second aspect of the disclosure is the first aspect, wherein the airbag is inflated and deployed in a tube shape including an opening at least one end of two vehicle width direction ends of the tube shape.

In the second aspect, the airbag is formed as described above, thereby enabling the airbag, including the inflation section and the hollow section previously described, to have a simple configuration.

A vehicle airbag device of a third aspect of the disclosure is the first aspect or the second aspect, wherein the vehicle seat is a rear seat disposed at a vehicle rear of a front seat, which is another vehicle seat, and the airbag is adapted to be inflated and deployed between a seatback of the front seat and the upper body of the occupant.

In the third aspect, the airbag that is inflated and deployed in the above manner restrains the upper body of the occupant while bearing reaction force from both the seatback of the front seat and the thighs of the occupant. This enables the upper body of the occupant to be stably restrained.

A vehicle airbag device of a fourth aspect of the disclosure is the third aspect, wherein the airbag is configured to be stored in the seatback of the front seat, and is inflated and deployed toward a vehicle rear side on being supplied with the gas.

In the fourth aspect, the airbag stored in the seatback of the front seat is inflated and deployed toward the vehicle rear side on being supplied with gas from the inflator. Namely, the airbag is inflated and deployed from the vehicle front side toward the occupant who is moving under inertia toward the vehicle front side under the impact of a front-end collision. Thus, in cases in which the inflation section has impinged on the occupant during inflation and deployment of the airbag, the inflation section bends more easily, and the front-rear direction dimension of the airbag is more easily reduced.

A vehicle airbag device of a fifth aspect of the disclosure is any one of the first aspect to the third aspect, wherein the airbag is configured to be stored in an armrest or a side door disposed beside the occupant, and is inflated and deployed toward one side in the vehicle width direction on being supplied with the gas.

In the fifth aspect, the airbag stored in the armrest or the side door disposed beside the seated occupant is inflated and deployed toward one side in the vehicle width direction on being supplied with the gas from the inflator. Since the airbag is inflated and deployed from the armrest or the side door in this manner, the inflation and deployment direction of the airbag is not greatly changed by an angle of incline of the seatback of the front seat, unlike cases in which the airbag is inflated and deployed from the seatback of the front seat as previously described.

A vehicle airbag device of a sixth aspect of the disclosure is any one of the first aspect to the fifth aspect, wherein the airbag includes a bag inner regulating member that is provided inside the inflation section, that couples together an outer peripheral portion and an inner peripheral portion at a hollow section side of the endless annular shaped inflation section, and that causes the inflation section to bend at plural locations along a circumferential direction of the inflation section accompanying inflation and deployment of the inflation section.

In the sixth aspect, the inflation section is bent as described above, thereby enabling an angle of a face of the inflation section abutted by the head (face) of the occupant to be set to a suitable angle, for example. The plural locations where the inflation section is bent form deformation origins when the inflation section is deformed under load from the occupant, thereby enabling the deformation mode of the inflation section to be stabilized.

A vehicle airbag device of a seventh aspect of the disclosure is the sixth aspect, wherein the bag inner regulating member runs continuously in an endless annular shape around the circumferential direction of the inflation section and includes plural holes arranged in the circumferential direction of the inflation section.

In the seventh aspect, stress concentrates at the locations between the plural holes in the bag inner regulating members when the inflation section is inflated and deployed. This enables the inflation section to be bent originating at the locations where the stress is concentrated.

A vehicle airbag device of an eighth aspect of the disclosure is the sixth aspect, wherein plural bag inner regulating members are arranged in the vehicle width direction of the inflation section.

In the eighth aspect, stress concentrates at the plural bag inner regulating members when the inflation section is inflated and deployed. This enables the inflation section to be bent originating at the plural bag inner regulating members.

A vehicle airbag device of a ninth aspect of the disclosure is any one of the first aspect to the eighth aspect, further including a bag outer regulating member that is provided inside the hollow section, that couples plural locations separated from each other in a circumferential direction at an inner peripheral portion on a hollow section side of the inflation section, and that causes the inflation section to bend at plural locations along the circumferential direction of the inflation section accompanying inflation and deployment of the inflation section.

In the ninth aspect, the inflation section is bent as described above, thereby enabling an angle of a face of the inflation section abutted by the head (face) of the occupant to be set to a suitable angle, for example. The plural locations where the inflation section is bent form deformation origins when the inflation section is deformed under load from the occupant, thereby enabling the deformation mode of the inflation section to be stabilized.

A vehicle occupant restraint device of a tenth aspect of the disclosure includes a pair of the vehicle airbag devices of any one of the first aspect to the ninth aspect, the airbags in the pair of vehicle airbag devices being inflated and deployed alongside each other in the vehicle width direction, and one airbag of the airbags being set with a larger vehicle width direction dimension in an inflated and deployed state than the other airbag.

In the tenth aspect, the airbags are inflated and deployed alongside each other in the vehicle width direction in the above manner, thereby enabling two occupants seated alongside each other in the vehicle width direction in the vehicle seat to be restrained by the respective airbags. Moreover, one airbag is set with a larger vehicle width direction dimension in the inflated and deployed state than the other airbag. Thus, for example, in cases in which three occupants are seated in a row in the vehicle width direction in the vehicle seat, the central occupant can be restrained by the one airbag.

As explained above, in configurations in which an airbag is inflated and deployed in front of an occupant seated in a vehicle seat, the vehicle airbag device and the vehicle occupant restraint device of the present disclosure are capable of preventing or suppressing an excessive load from the airbag being borne by the occupant, even in cases in which there is a short distance between the occupant and an interior component positioned in front of the occupant.

BRIEF DESCRIPTION OF THE DRAWINGS

Preferred embodiments will be described in detail based on the following figures, wherein.

DETAILED DESCRIPTION

First Exemplary Embodiment

Figure 1:
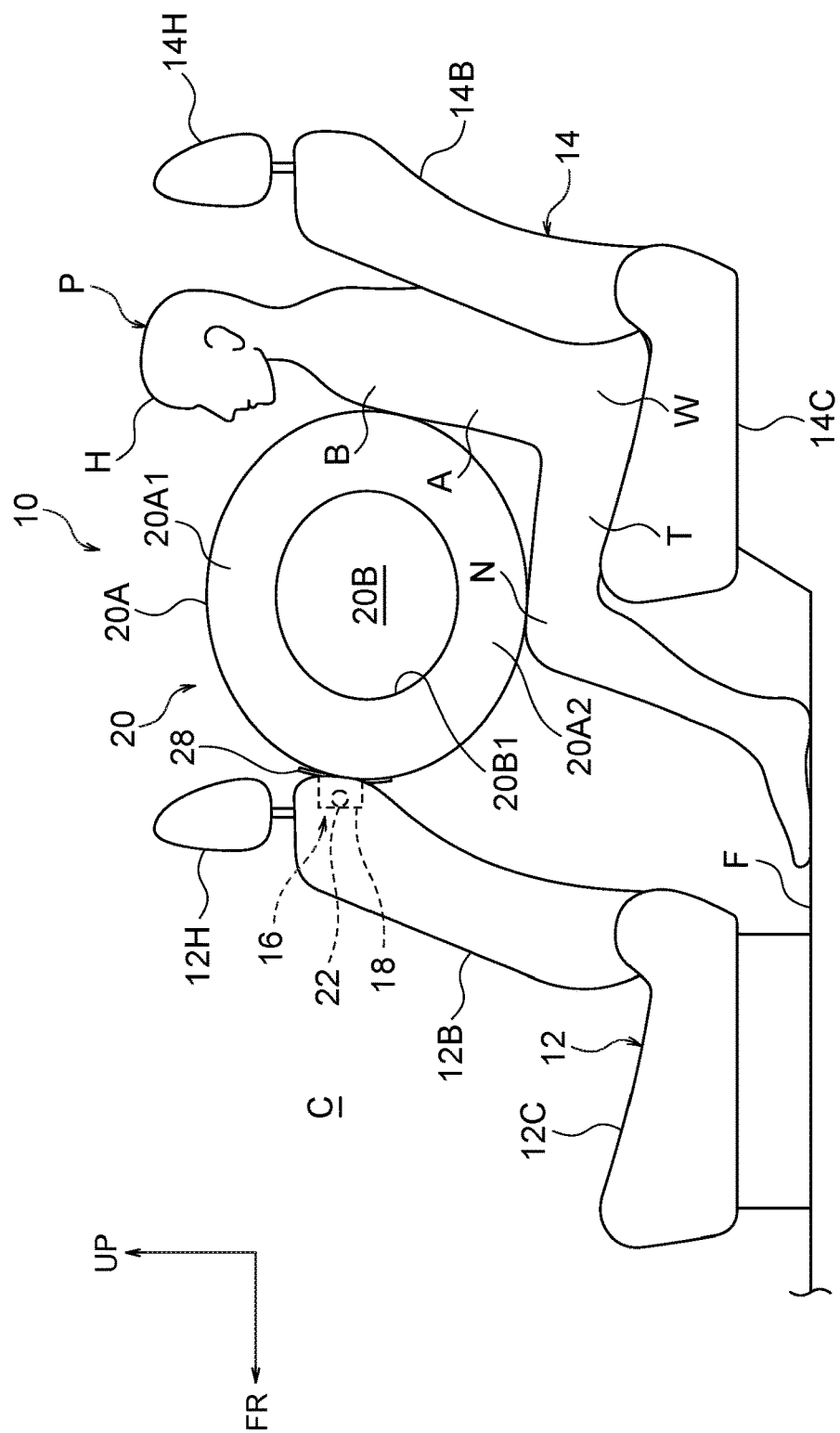
FIG. 1 is a side-on view schematically illustrating a cabin interior of a vehicle applied with a vehicle airbag device according to a first exemplary embodiment of the present disclosure, illustrating an airbag in an inflated and deployed state.

Explanation follows regarding a rear seat airbag device 10 serving as a vehicle airbag device according to a first exemplary embodiment of the present disclosure, with reference to FIG. 1 to FIG. 4C. Note that some reference numerals and some members are sometimes omitted from each of the drawings in order to facilitate viewing of the drawings. In each of the drawings as appropriate, the arrow FR, the arrow UP, and the arrow RH respectively indicate the front, upper side, and right side of a vehicle (hereafter simply referred to as "vehicle"; not illustrated in the drawings) applied with the rear seat airbag device 10. In the below explanation, unless specifically stated otherwise, simple reference to the front-rear, vertical, and left-right directions refers to front-rear in the vehicle front-rear direction, vertical in the vehicle vertical direction, and left-right in the vehicle left-right direction (vehicle width direction).

FIG. 1 is a side-on view schematically illustrating the interior of a cabin C of the vehicle applied with the rear seat airbag device 10. As illustrated in FIG. 1, a front seat 12, and a rear seat 14 disposed at the vehicle rear of the front seat 12, are provided in the cabin C interior. The front seat corresponds to "another vehicle seat" of the present disclosure, and the rear seat 14 corresponds to "a vehicle seat" of the present disclosure. Note that an airbag 20 of the rear seat airbag device 10, described later, is illustrated in an inflated and deployed state in FIG. 1. An occupant P seated in the rear seat 14 in FIG. 1 is, for example, a dummy of a 50th percentile American adult male (AM50). The occupant P is hereafter referred to as "rear seat occupant P".

The front-rear, vertical, and left-right directions of the front seat 12 and the rear seat 14 match the front-rear, vertical, and left-right directions of the vehicle. The front seat 12 and the rear seat 14 respectively include a seat cushion 12C, 14C, a seatback 12B, 14B, and a headrest 12H, 14H. The seat cushion 12C of the front seat 12 is coupled to a floor F of the cabin C through a non-illustrated, known slide mechanism, such that a front-rear position of the seat cushion 12C with respect to the floor F is adjustable. The seatback 12B of the front seat 12 is coupled to a rear end portion of the seat cushion 12C through a non-illustrated, known reclining mechanism, such that an angle of incline (reclining angle) of the seatback 12B with respect to the seat cushion 12C is adjustable. The seat cushion 14C and the seatback 14B of the rear seat 14 are fixed to the vehicle body of the vehicle so as to be incapable of being displaced.

Note that a configuration may be applied in which a front-rear position of the seat cushion 14C of the rear seat 14 with respect to the floor F is adjustable, and an angle of incline of the seatback 14B of the rear seat 14 with respect to the seat cushion 14C is adjustable. In the present exemplary embodiment, the front seat 12 configures a front seat (a first row seat) of the vehicle, and the rear seat 14 configures a rear seat (a second row seat) of the vehicle; however, configuration is not limited thereto. A configuration may be applied in which the front seat 12 configures a seat in the second row onward of the vehicle, and the rear seat 14 configures a seat in a third row onward of the vehicle.

An occupant restraint seatbelt device (not illustrated in the drawings) is provided at both the front seat 12 and the rear seat 14. Each seatbelt device is what is referred to as a three-point seatbelt device. Configuration is thereby such that the lumbar region W of the rear seat occupant P illustrated in FIG. 1 is restrained by a lap belt, and the upper body (the chest B, abdomen A, and so on) is restrained by a shoulder belt.

Figure 2:
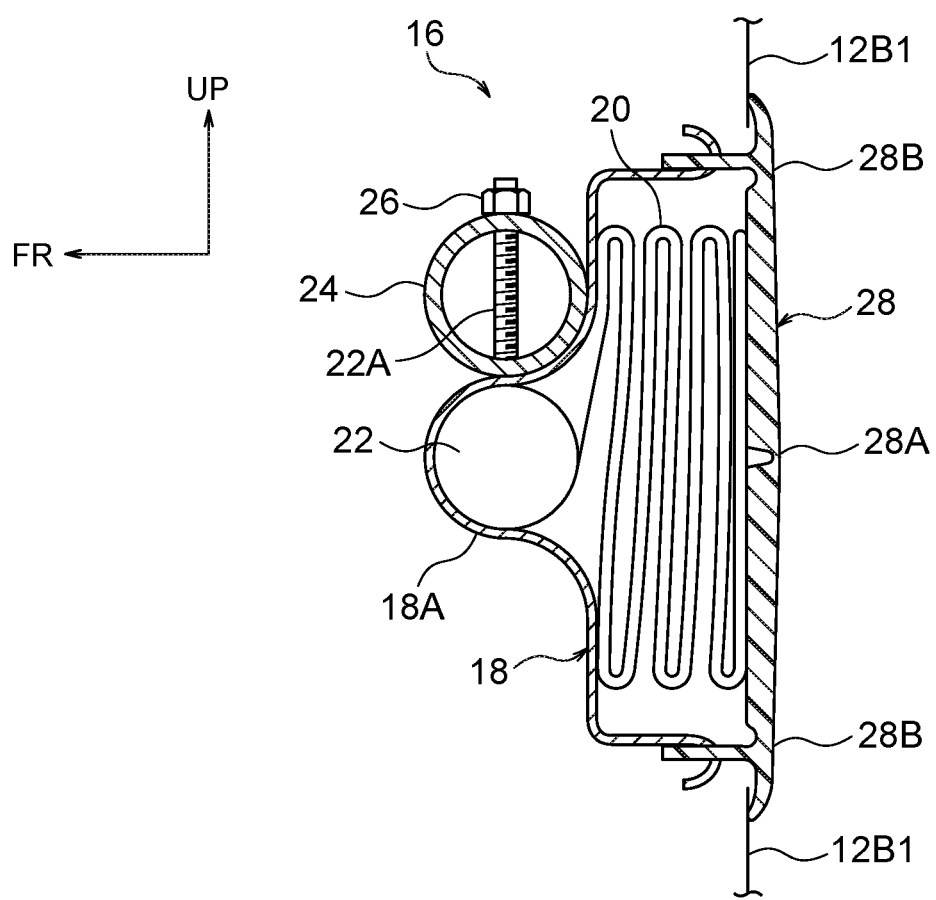
FIG. 2 is a cross-section of an airbag module included in the vehicle airbag device.

An airbag module 16, configuring a relevant portion of the rear seat airbag device 10, is installed in a back face side of an upper portion of the seatback 12B of the front seat 12. As illustrated in FIG. 2, the airbag module 16 is configured including a module case 18, the airbag 20, and an inflator 22.

The module case 18 is a metal box open toward the seat rear side, and includes a protrusion 18A protruding out toward the seat front side from a bottom face that faces the opening. The cylinder-type inflator 22 and the airbag 20 in a folded state are stored inside the airbag module 16. The inflator 22 is housed inside the protrusion 18A, and a stud bolt 22A provided to the inflator 22 pierces through the module case 18 and a frame 24 of the seatback 12B, and is screwed together with a nut 26. The module case 18 is thereby fastened and fixed to the frame 24 of the seatback 12B using the inflator 22. Note that the inflator 22 is not limited to being configured as a cylinder type, and the inflator 22 may be configured as a disk type.

The opening of the module case 18 is closed off by a resin airbag door 28, and an outer face of the airbag door 28 is disposed in a position that is on substantially the same plane as a back face 12B1 of the seatback 12B. A thin tear portion 28A is formed in an inner face (a face facing the airbag 20 in the folded state) of the airbag door 28. The tear portion 28A configures a planned rupture portion that ruptures under inflation pressure of the airbag 20, and is formed in an H shape, for example, as viewed from the seat rear side.

An upper and lower pair of hinges 28B, configuring thinned portions with a greater thickness than the tear portion 28A, are formed running along the vehicle width direction in an upper end portion and a lower end portion of the inner face of the airbag door 28. When the tear portion 28A ruptures under the inflation pressure of the airbag 20, the airbag door 28 is opened in the manner of an upper and lower double doors that have the upper and lower hinges 28B. The airbag 20 is thereby inflated and deployed toward the vehicle rear side of the seatback 12B.

The inflator 22 is housed inside the airbag 20, and is electrically connected to an airbag ECU (controller). When the inflator 22 is actuated by the airbag ECU, the airbag 20 receives gas supplied from the inflator 22 and is inflated and deployed. A collision sensor (or a group of sensors) that is capable of detecting or predicting a front-end collision of the vehicle is electrically connected to the airbag ECU. The airbag ECU is configured so as to actuate the inflator 22 on detecting or predicting a front-end collision based on information from the collision sensor. The modes of front-end collision include oblique collisions, offset collisions, and the like.

Figure 3:
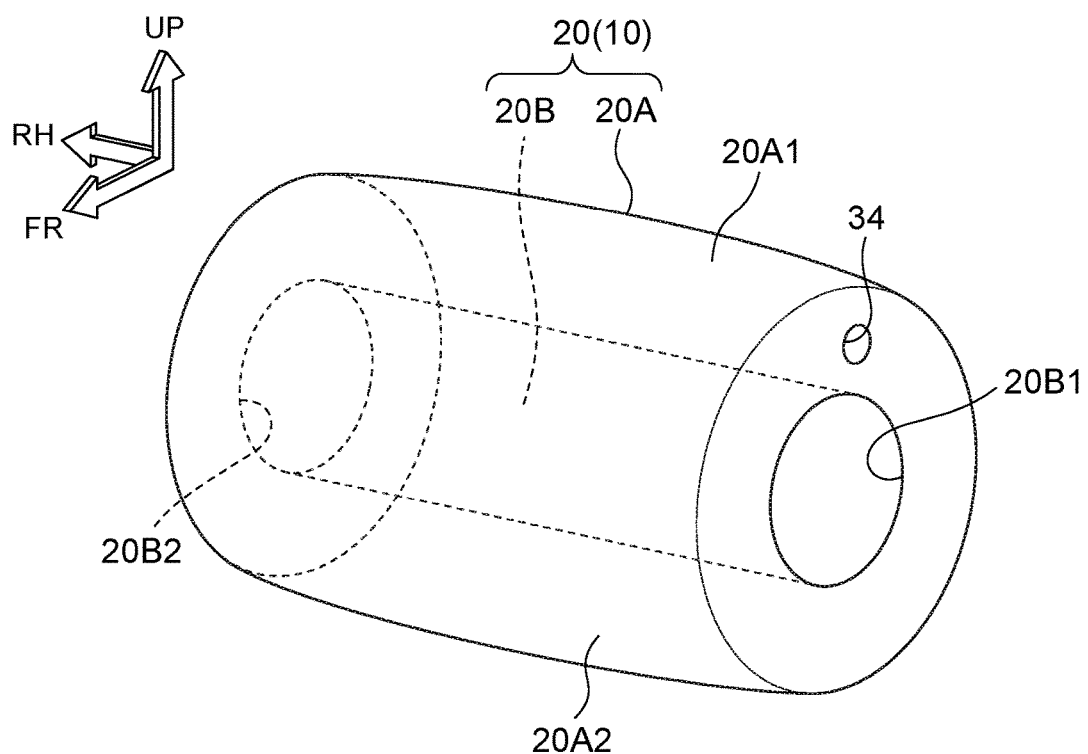
FIG. 3 is a perspective view schematically illustrating an inflated and deployed state of an airbag according to the first exemplary embodiment.

As an example, the airbag 20 is formed in a bag shape by stitching together outer peripheral edges of plural base cloths, and is formed so as to have a circular tube shape in the inflated and deployed state, as illustrated in FIG. 3. The airbag 20 is configured so as to be inflated and deployed in front of the upper body (the abdomen A, chest B, head H, and so on) and above the thighs T and knees N of the rear seat occupant P (see FIG. 1) on receiving gas supplied from the inflator 22. When inflated and deployed, the airbag 20 includes an inflation section 20A forming an endless annular shape as viewed along the vehicle width direction. A hollow section 20B formed in a central portion (axial center portion) of the inflation section 20A as viewed along the vehicle width direction is configured so as to be in communication with the airbag 20 exterior. Detailed explanation follows below.

The airbag 20 is inflated and deployed in a tube shape (a circular tube shape in this case) including openings 20B1, 20B2 at respective vehicle width direction ends thereof. A vehicle width direction dimension of the airbag 20 in the inflated and deployed state is set so as to be the same or greater than a vehicle width direction dimension of the rear seat occupant P, for example. A vent hole 34 is formed at an end face of the inflation section 20A of the airbag 20 that faces one side in the vehicle width direction (the vehicle left side in this case) in the inflated and deployed state. The inflation section 20A interior and the inflation section 20A exterior (the airbag 20 exterior) are in communication with each other through the vent hole 34.

The hollow section 20B formed in the axial center portion of the inflation section 20A is in communication with the airbag 20 exterior through the openings 20B1, 20B2. Namely, the two axial direction end portions of the hollow section 20B respectively configure the openings 20B1, 20B2. Air at the airbag 20 exterior (air in the cabin C interior) flows into the hollow section 20B when the airbag 20 is inflated and deployed. The hollow section 20B is not supplied with gas from the inflator 22.

Figure 4A:
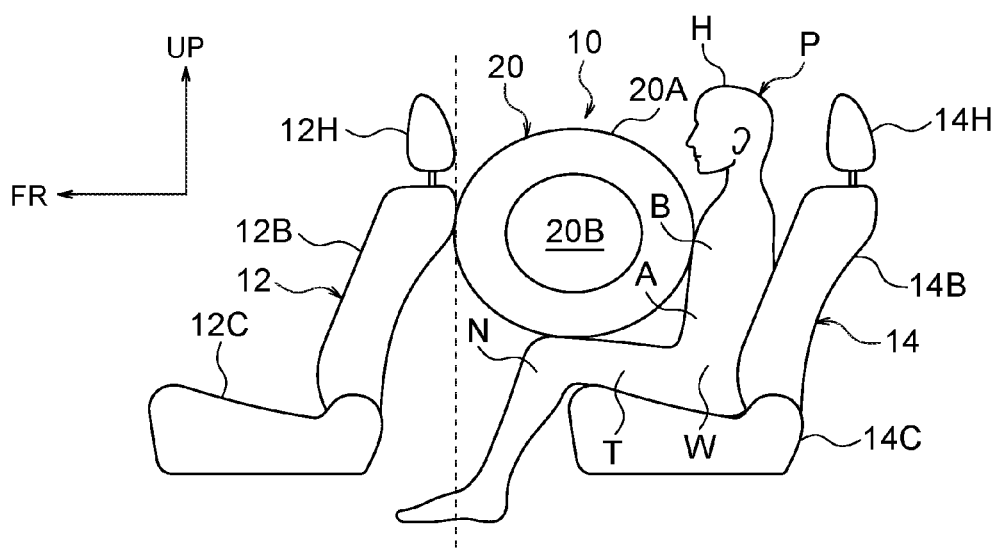
FIG. 4A is a side-on view corresponding to FIG. 1, illustrating a state in which an airbag has been inflated and deployed from a seatback of a front seat positioned in a reference setting position.
Figure 4B:
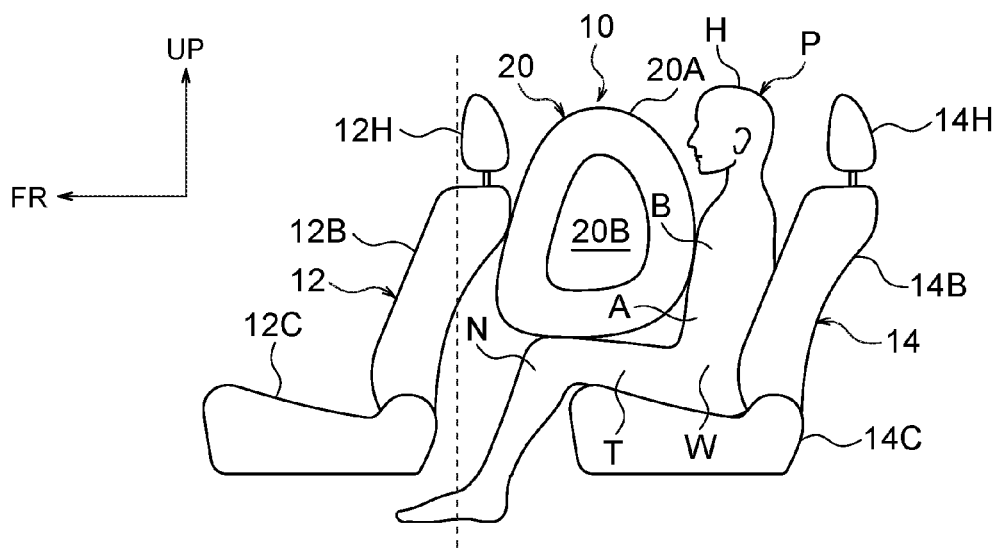
FIG. 4B is a side-on view corresponding to FIG. 4A, illustrating a state in which an airbag has been inflated and deployed from a seatback of a front seat that has been slid further toward the vehicle rear side than the reference setting position.
Figure 4C:
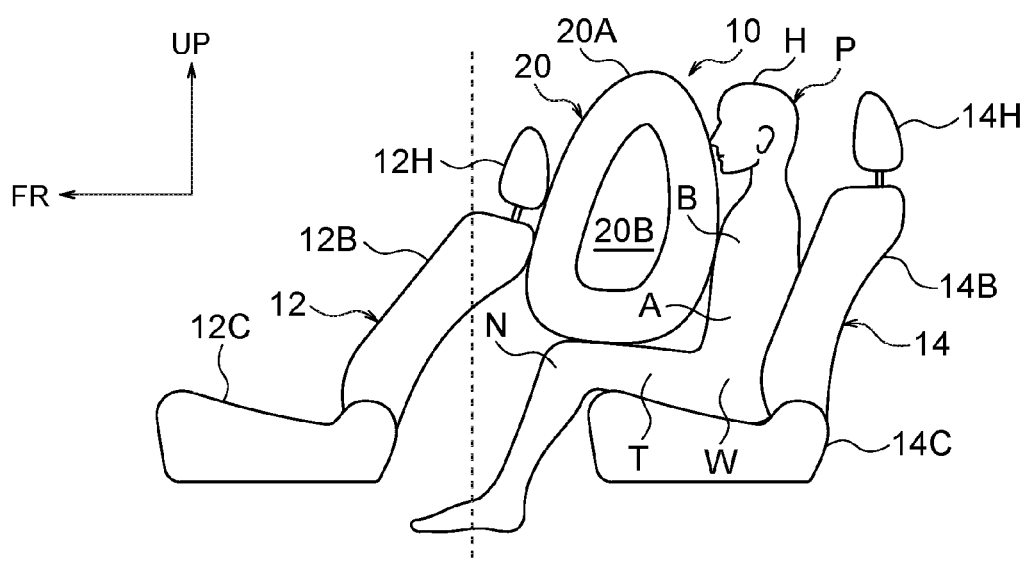
FIG. 4C is a side-on view corresponding to FIG. 4A, illustrating a state in which an airbag has been inflated and deployed from a seatback of a front seat that is reclined further toward the vehicle rear side than the reference setting position.

In a state in which the front seat 12 is positioned in a reference setting position illustrated in FIG. 1 and FIG. 4A, the thus-configured airbag 20 is set with a shape and size so as to contact the thighs T and the chest B of the rear seat occupant P with a low load, or so as to face the thighs T and the chest B in close proximity thereto, on having been inflated and deployed toward the vehicle rear side from the seatback 12B of the front seat 12.

Operation and Advantageous Effects

Explanation follows regarding operation and advantageous effects of the first exemplary embodiment.

In the rear seat airbag device 10 with the above configuration, the inflator 22 is actuated by the airbag ECU when the airbag ECU detects or predicts a front-end collision of the vehicle based on signals from the collision sensor. The airbag 20, which accordingly receives gas supplied from the inflator 22, is thereby inflated and deployed in front of the upper body (the abdomen A, chest B, head H, and so on) and above the thighs T and knees N of the rear seat occupant P.

The airbag 20 includes the inflation section 20A that inflates and deploys so as to form an endless annular shape as viewed along the vehicle width direction. The hollow section 20B formed in the central portion of the inflated and deployed inflation section 20A is in communication with the airbag 20 exterior. Air at the airbag 20 exterior flows into the hollow section 20B on inflation and deployment. Providing the hollow section 20B to the airbag 20 flexibly changes the inflated and deployed shape of the airbag 20 according to a distance between the seatback 12B of the front seat 12 and the rear seat occupant P. This enables an excessive load from the airbag 20 to be prevented or suppressed from being borne by the rear seat occupant P. This advantageous effect is explained in detail with reference to a comparative example 200 illustrated in FIG. 5A to FIG. 5C.

The comparative example 200 has basically the same configuration as that of the present exemplary embodiment, but configuration of an airbag 202 differs from that of the airbag 20 according to the present exemplary embodiment. The airbag 202 is formed in a simple bag shape. Namely, the airbag 202 does not include the hollow section 20B according to the present exemplary embodiment, and is only configured including an inflation section. In a state in which the front seat 12 has been positioned in the reference setting position illustrated in FIG. 5A, the airbag 202 is set with a shape and size so as to contact the thighs T and chest B of the rear seat occupant P with a low load, or so as to face the thighs T and chest B in close proximity thereto, on having been inflated and deployed toward the vehicle rear side from the seatback 12B of the front seat 12. Since the airbag 202 is only configured by the inflation section, a front-rear direction dimension L of the airbag 202 does not readily change in an inflated and deployed state in which high pressure gas has been supplied therein. Thus, in cases in which the airbag 202 has been inflated and deployed in a state in which the distance between the seatback 12B of the front seat 12 and the rear seat occupant P is short, there is a possibility that the rear seat occupant P might bear an excessive load from the airbag 202.

Figure 5A:
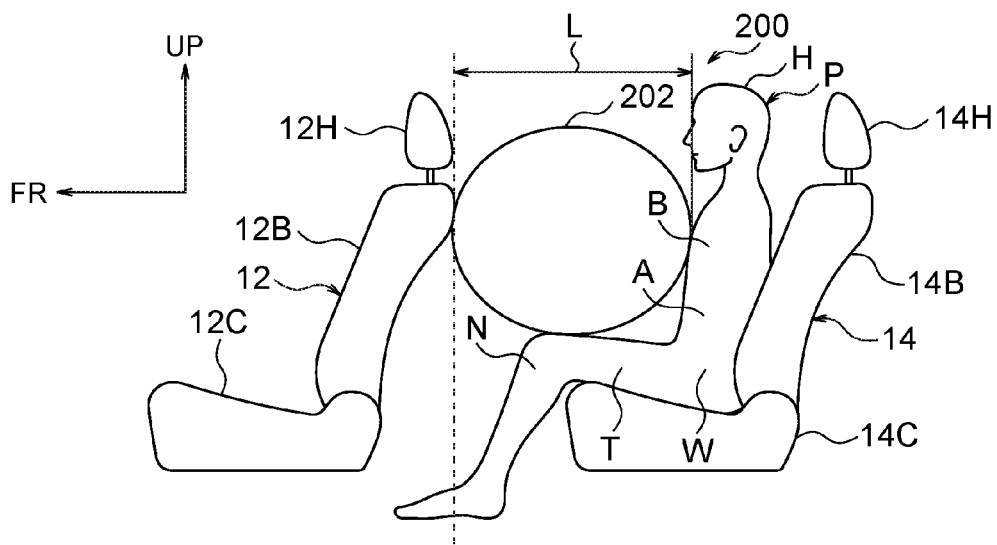
FIG. 5A is a side-on view of a comparative example corresponding to FIG. 4A, illustrating a state in which an airbag has been inflated and deployed from a seatback of a front seat positioned in a reference setting position.
Figure 5B:
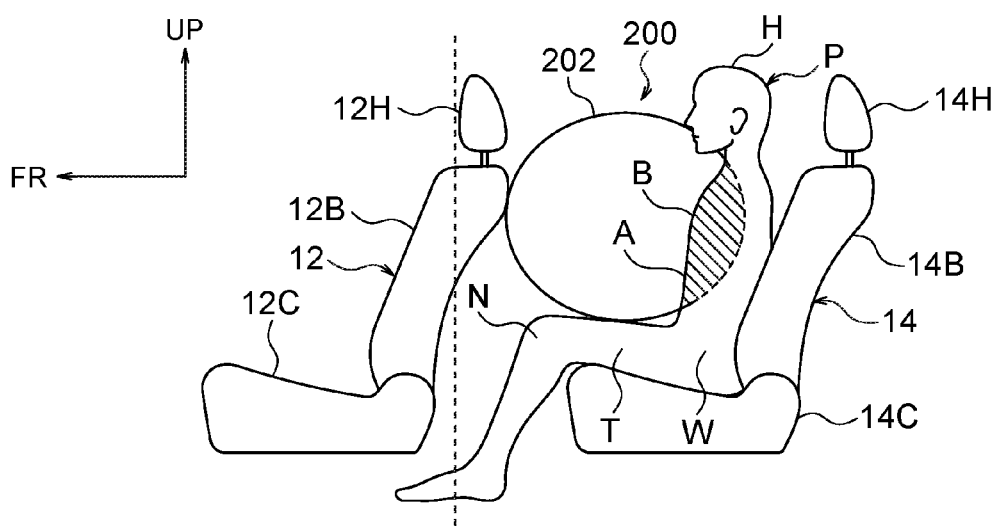
FIG. 5B is a side-on view of a comparative example corresponding to FIG. 5A, illustrating a state in which an airbag has been inflated and deployed from a seatback of a front seat that has been slid further toward the vehicle rear side than the reference setting position.
Figure 5C:
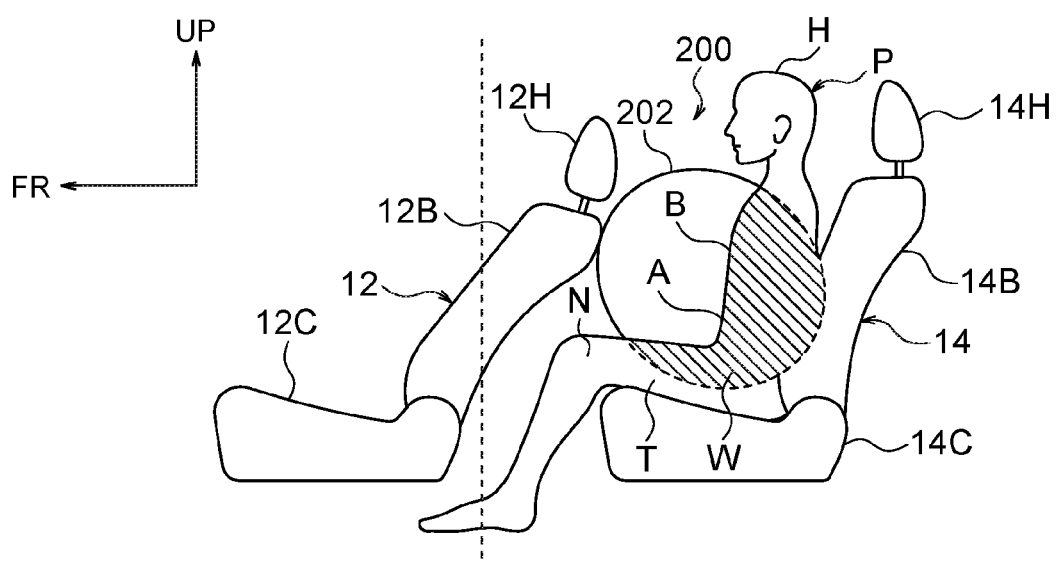
FIG. 5C is a side-on view of a comparative example corresponding to FIG. 5A, illustrating a state in which an airbag has been inflated and deployed from a seatback of a front seat that has reclined further toward the vehicle rear side than the reference setting position.

For example, the distance between the rear seat occupant P and the seatback 12B of the front seat 12 is shorter in a state in which the front seat 12 has been slid further toward the vehicle rear side (see FIG. 5B) than the reference setting position of the front seat 12 (see FIG. 5A) and in a state in which the seatback 12B has been reclined further toward the vehicle rear side (see FIG. 5C) than the reference setting position of the front seat 12 (see FIG. 5A). When the airbag 202 is inflated and deployed in such states, the airbag 202 impinges on the rear seat occupant P in a region illustrated by hatching in FIG. 5B and FIG. 5C. There is accordingly a possibility that the rear seat occupant P might bear an excessive load from the airbag 202. Note that the front-rear position and angle of incline of the seatback 12B of the front seat 12 is changed by being adjusted by an occupant (not illustrated in the drawings) seated in the front seat 12, and there is no specific suitable position. There is accordingly a possibility of the above-described issue occurring.

In contrast thereto, in the present exemplary embodiment, in cases in which the airbag 20 has been inflated and deployed in a state in which the front seat 12 has been slid further toward the vehicle rear side than the reference setting position (see FIG. 4B) and in a state in which the seatback 12B of the front seat 12 has been reclined further toward the vehicle rear side than the reference setting position (see FIG. 4C), the hollow section 20B is squashed in the vehicle front-rear direction while discharging air from its interior, so as to bend at one or plural locations in the circumferential direction of the inflation section 20A while the inflation section 20A maintains its internal pressure. A front-rear direction dimension of the airbag 20 when inflation and deployment is complete is reduced accordingly. Namely, in cases in which an the airbag 20 has impinged on an obstacle (the rear seat occupant P in this case) during inflation and deployment to the set front-rear direction dimension, the tube shaped inflation section 20A bends at one or plural locations in the circumferential direction, such that the airbag 20 is inflated and deployed with a shorter front-rear direction dimension than the set front-rear direction dimension. This enables an excessive load from the airbag 20 to be prevented from being borne by the rear seat occupant P.

As previously described, the airbag 20 is inflated and deployed in front of the upper body and above the thighs T of the occupant P seated in the rear seat 14. The rear seat occupant P is moving toward the vehicle front side under force due to inertia when this occurs. Since the rear seat occupant P is wearing a seatbelt that is a three-point seatbelt device, this movement of the rear seat occupant P toward the vehicle front side takes a form in which the upper body tilts forward about the lumbar region W. Thus, the inflated and deployed airbag 20 restrains the upper body of the rear seat occupant P, while bearing reaction force from the seatback 12B of the front seat 12 and the thighs T of the rear seat occupant P. Thus, even in cases in which the forward movement amount of the rear seat occupant P increases due to insufficient restraint force by the non-illustrated seatbelt, the airbag 20 restrains the head H and the chest B, thereby enabling the rear seat occupant P to be prevented from contacting interior components such as the headrest 12H or the seatback 12B of the front seat 12, as well as a non-illustrated center pillar.

Moreover, the inflated and deployed inflation section 20A is formed so as to form an endless annular shape as viewed along the vehicle width direction, such that load applied to the inflation section 20A from the rear seat occupant P is transmitted to the seatback 12B along two paths, these being an upper portion 20A1 and a lower portion 20A2 of the inflation section 20A (see FIG. 1). This enables the rear seat occupant P to be stably supported by the airbag 20, thereby enabling occupant restraint performance to be improved. Namely, for example, if configuration were such that an inflation section of an airbag was inflated and deployed in an inverted U shape as viewed along the vehicle width direction, there would only be one transmission path by which load from a rear passenger seat occupant was transmitted to the seatback through the airbag, such that there would be a possibility that support of the rear seat occupant by the airbag might become unstable. However, the present exemplary embodiment enables this to be avoided.

In the present exemplary embodiment, the airbag 20, which is inflated and deployed between the seatback 12B of the front seat 12 and the upper body of the rear seat occupant P, restrains the upper body of the rear seat occupant P while bearing reaction force from both the seatback 12B of the front seat 12 and the thighs T of the rear seat occupant P. This enables the upper body of the rear seat occupant P to be stably restrained. Furthermore, the airbag 20 is supported between the seatback 12B, and the thighs T and chest B, increasing a contact surface area between the rear seat occupant P and the airbag 20, such that the head H is restrained by the airbag 20 in a state in which the airbag 20 is well supported. Thus, the airbag 20 is less liable to be displaced unintentionally under load from the head H, thereby improving restraint performance of the head H.

In the present exemplary embodiment, the airbag 20 stored in the seatback 12B of the front seat 12 is inflated and deployed toward the vehicle rear side on receiving gas supplied from the inflator 22. Namely, the airbag 20 is inflated and deployed from the vehicle front side toward the rear seat occupant P, who is moving under inertia toward the vehicle front side due to the impact of a front-end collision. Thus, in cases in which the inflation section 20A impinges on the rear seat occupant P during inflation and deployment of the airbag 20, the inflation section 20A bends more easily, and the front-rear direction dimension of the airbag 20 when inflation and deployment is complete is more easily reduced.

In the present exemplary embodiment, the airbag 20 is formed so as to inflate and deploy in a circular tube shape including the openings 20B1, 20B2 at respective vehicle width direction ends thereof. This enables the airbag 20, including the inflation section 20A and the hollow section 20B previously described, to have a simple configuration. Note that one of the openings 20B1, 20B2 may be configured so as to be closed off by the base cloths of the inflation section 20A.

Note that the first exemplary embodiment is configured such that the airbag 20 is stored in the seatback 12B of the front seat 12; however, there is no limitation thereto, and configuration may be such that the airbag 20 is stored in the headrest 12H of the front seat 12. In such cases, the headrest 12H and the seatback 12B are preferably integrally formed (a headrest section is provided that cannot be removed from an upper end portion of a seatback of a front seat). Alternatively, a configuration may be applied in which an airbag is stored spanning between a seatback and a headrest of a front seat.

Explanation follows regarding other exemplary embodiments of the present disclosure. Note that configuration and operation that is basically the same as those in the first exemplary embodiment are appended with the same reference numerals as those in the first exemplary embodiment, and explanation thereof is omitted.

Second Exemplary Embodiment

Figure 6:
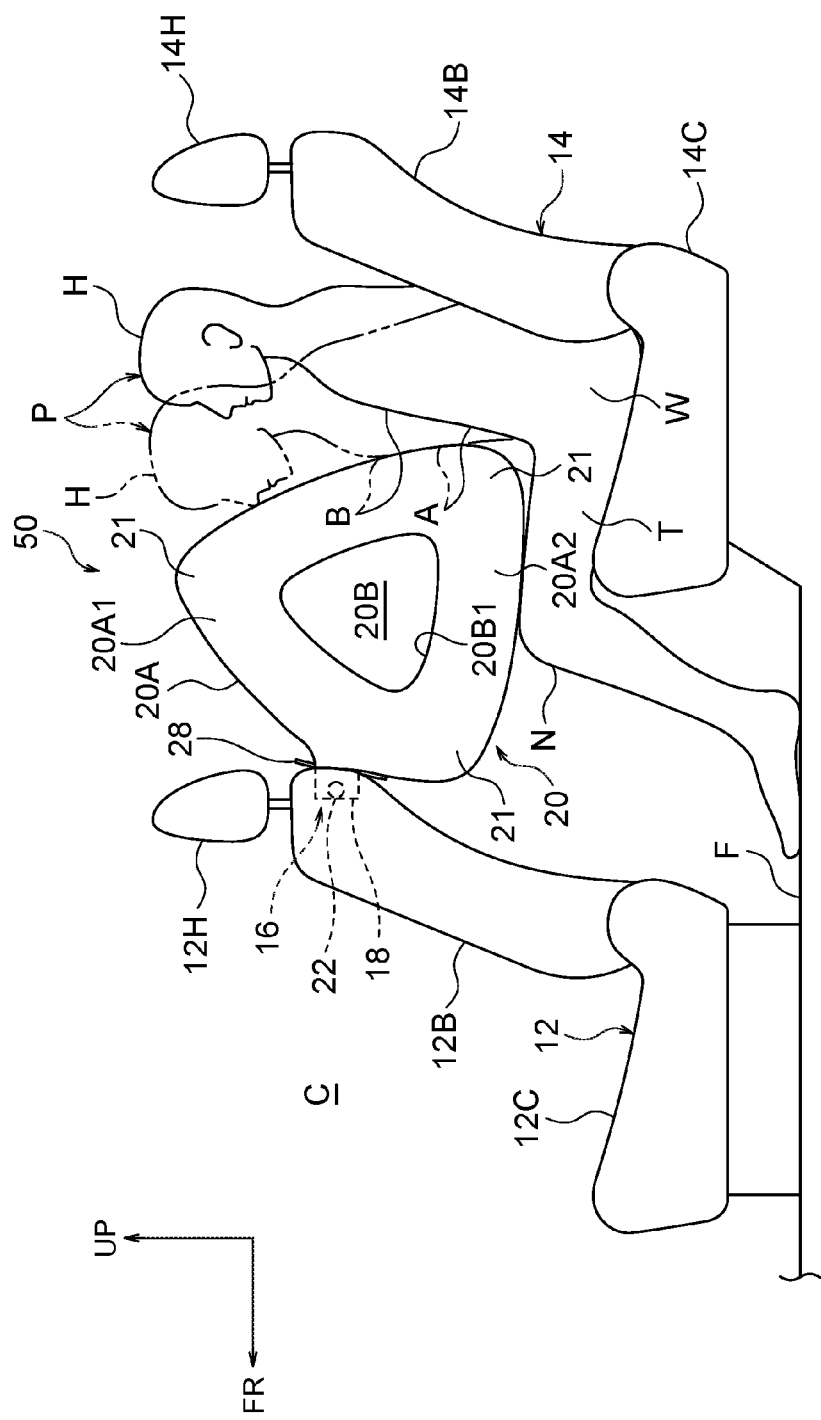
FIG. 6 is a side-on view corresponding to FIG. 1, illustrating a cabin interior of a vehicle applied with a vehicle airbag device according to a second exemplary embodiment of the present disclosure.
Figure 7:
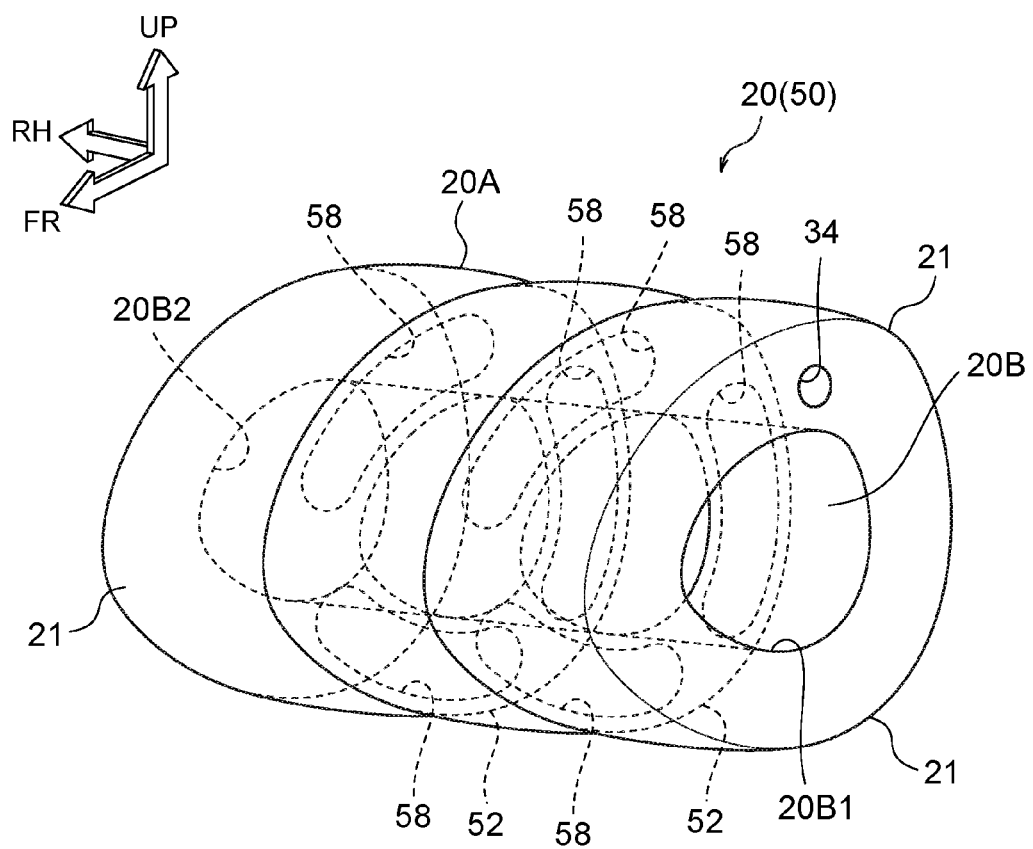
FIG. 7 is a perspective view schematically illustrating an inflated and deployed state of an airbag according to the second exemplary embodiment.
Figure 8A:
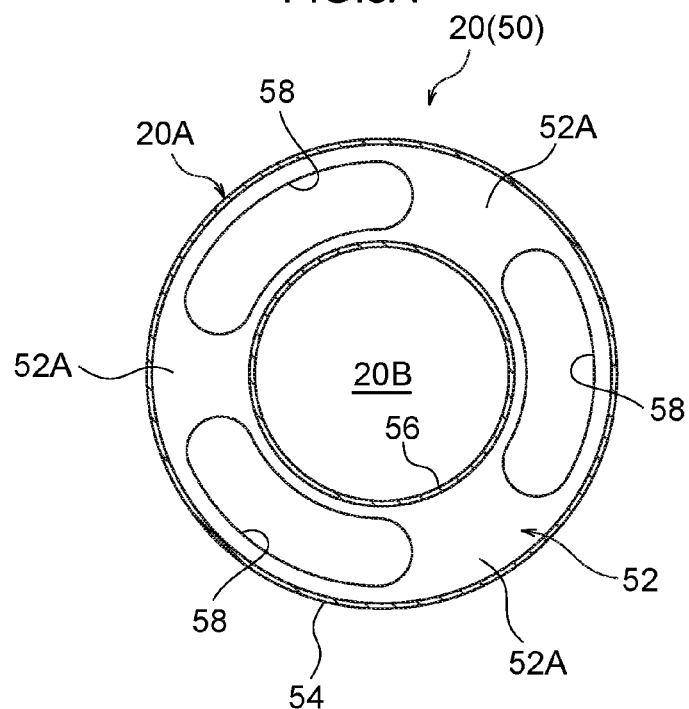
FIG. 8A is a cross-section of a state prior to folding an airbag according to the second exemplary embodiment, as viewed from the axial direction of an inflation section.
Figure 8B:
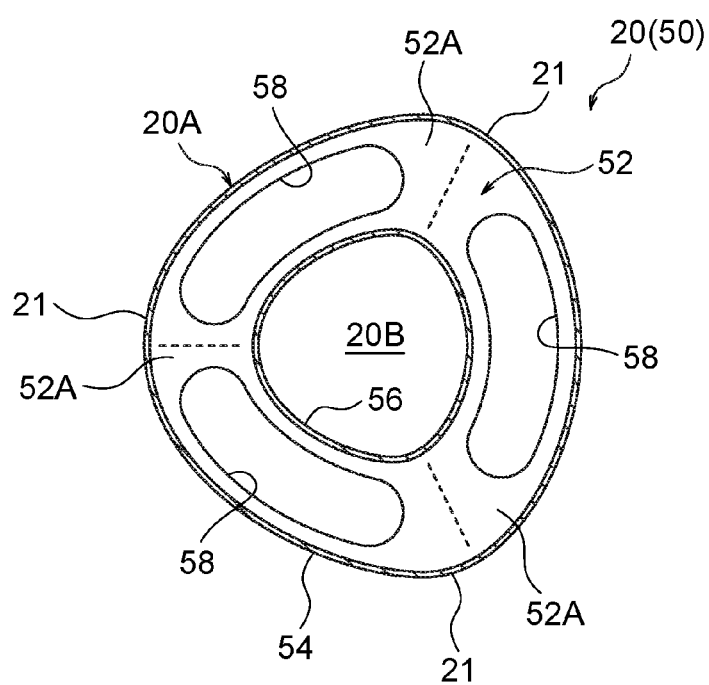
FIG. 8B is a cross-section corresponding to FIG. 8A, illustrating an inflated and deployed state in which an airbag according to the second exemplary embodiment has received gas supplied from an inflator.

FIG. 6 is a side-on view corresponding to FIG. 1, illustrating the interior of a cabin C of a vehicle applied with a rear seat airbag device 50 serving as a vehicle airbag device according to a second exemplary embodiment of the present disclosure. Although the present exemplary embodiment has basically the same configuration as that in the first exemplary embodiment, as illustrated in FIG. 7, FIG. 8A, and FIG. 8B, two bag inner tethers 52 are provided inside the inflation section 20A of the airbag 20 in the present exemplary embodiment. The two bag inner tethers 52 correspond to a "bag inner regulating member" of the present disclosure.

The two bag inner tethers 52 are each formed by cutting a similar cloth to the base cloths of the inflation section 20A into an annular shape (ring shape), and are installed so as to be arranged in the vehicle width direction inside the inflated and deployed inflation section 20A with a spacing therebetween. As illustrated in FIG. 8A, an outer circumferential edge of each bag inner tether 52 is joined by a means such as stitching to an outer base cloth 54 configuring an outer circumferential section of the inflation section 20A, and an inner circumferential edge of each bag inner tether 52 is joined by a means such as stitching to an inner base cloth 56 configuring an inner circumferential section of the inflation section 20A.

The bag inner tethers 52 each run continuously around the circumferential direction of the inflation section 20A in an endless annular shape, and partition the inflation section 20A into three chambers in the vehicle width direction. However, plural (three in this case) holes 58, arranged along the circumferential direction of the inflation section 20A, are formed in each bag inner tether 52, and the respective chambers are in communication with each other through the holes 58. The three holes 58 are formed so as to be arranged at uniform spacings or substantially uniform spacings along the circumferential direction of the inflation section 20A in the inflated and deployed state of the inflation section 20A.

Locations between the three holes 58 in each bag inner tether 52 respectively configure stress concentration sections 52A where stress concentrates during inflation and deployment of the inflation section 20A. Stress concentrates at each stress concentration portion 52A due to the internal pressure of the inflation section 20A rising because of gas being supplied from the inflator 22. Specifically, locations illustrated by intermittent lines (imaginary lines) in FIG. 8B are deformed by stress concentrating. Thus, the inflation section 20A is bent at plural locations (three in this case) along the circumferential direction accompanying inflation and deployment of the inflation section 20A, and three bent sections 21 are formed in the inflation section 20A. The bent sections 21 are respectively formed at locations corresponding to the stress concentration sections 52A, at uniform spacings or substantially uniform spacings along the circumferential direction of the inflation section 20A. The inflated and deployed inflation section 20A is thereby configured so as to form a substantially triangular tube shape as viewed along the vehicle width direction. Other configuration is similar to that in the first exemplary embodiment.

In the present exemplary embodiment, the inflated and deployed inflation section 20A is bent in the above manner, thereby enabling an angle of a face of the inflation section 20A abutted by the head H (face) of the occupant to be set to a suitable (optimal) angle (see the rear seat occupant P illustrated by the double-dotted dashed line in FIG. 6), for example. The plural bent sections 21 where the inflation section 20A is bent form deformation origins when the inflation section 20A is deformed under load from the rear seat occupant P, thereby enabling the deformation mode of the inflation section 20A to be stabilized.

Moreover, for example, although not illustrated in the drawings, the inflation section 20A can be caused to bend such that a location of the inflation section 20A contacting the knees N of the rear seat occupant P is interposed between the knees N and the seatback 12B. This enables the location of the inflation section 20A interposed between the knees N and the seatback 12B to function as what is referred to as a knee airbag. This enables forward movement of the knees N during a front-end collision to be suppressed, and enables occupant restraint performance by the airbag 20 to be improved.

The second exemplary embodiment is configured such that two bag inner tethers 52 are provided inside the inflation section 20A; however, there is no limitation thereto, and the number of bag inner tethers 52 may be changed as appropriate. The second exemplary embodiment is also configured such that the bag inner tethers 52 (bag inner regulating members) are formed using a similar cloth to the base cloths of the airbag 20; however, there is no limitation thereto. Configuration may be such that a bag inner regulating member is formed using an elastic member in sheet form or in cord form. This similarly applies to bag inner tethers 62 and bag outer tethers 72, described later.

Figure 9:
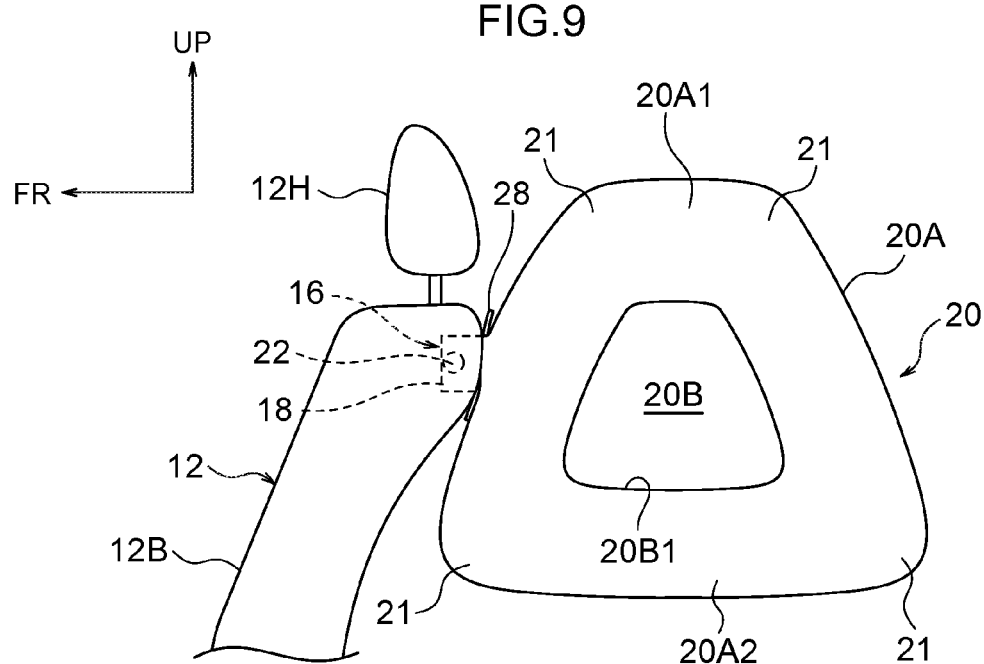
FIG. 9 is a side-on view corresponding to part of FIG. 6, illustrating a modified example of an airbag according to the second exemplary embodiment.

The second exemplary embodiment is configured such that the inflation section 20A is bent at the bent sections 21 in three locations along the circumferential direction; however, configuration is not limited thereto. The number of bent sections 21 may be changed as appropriate, and the inflated and deployed shape of the inflation section 20A may be a polygonal tube shape. For example, as in a modified example illustrated in FIG. 9, the inflation section 20A may be configured so as to be bent at bent sections 21 in four locations along the circumferential direction. This similarly applies to a third exemplary embodiment and a fourth exemplary embodiment described below.

Third Exemplary Embodiment

Figure 10:
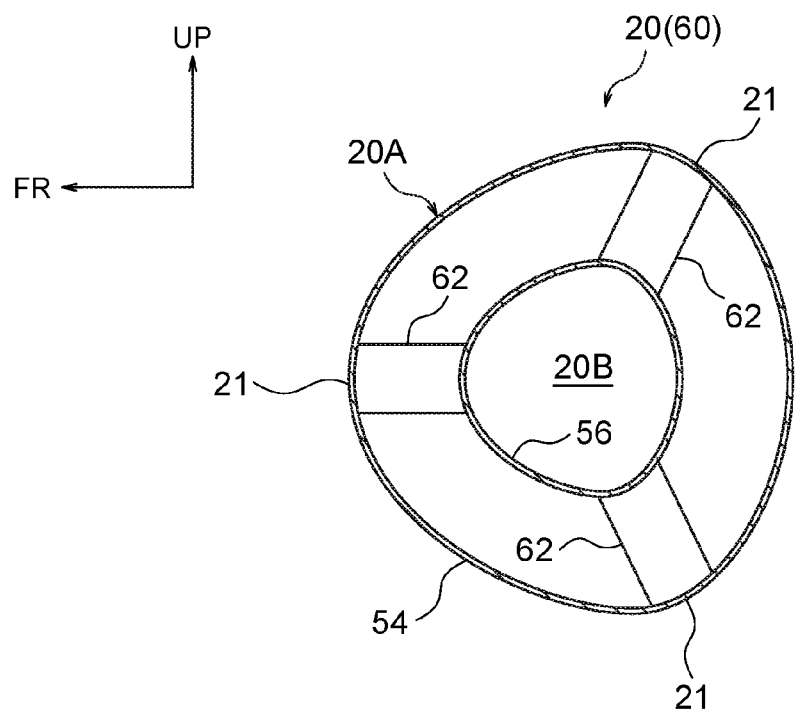
FIG. 10 is a cross-section corresponding to FIG. 8B, illustrating an airbag included in a vehicle airbag device according to a third exemplary embodiment of the present disclosure.

FIG. 10 is a cross-section corresponding to FIG. 8B, illustrating an inflated and deployed state of an airbag 20 included in a rear seat airbag device 60 serving as a vehicle airbag device according to the third exemplary embodiment of the present disclosure. In the present exemplary embodiment, plural (three in this case) bag inner tethers 62 are provided inside the inflation section 20A of the airbag 20. The three bag inner tethers 62 correspond to a "bag inner regulating member" of the present disclosure.

The three bag inner tethers 62 are each formed by cutting a similar cloth to the base cloths of the inflation section 20A into an elongated belt shape, and are installed inside the inflation section 20A so as to be arranged at uniform spacings or substantially uniform spacings along the circumferential direction of the inflation section 20A. One length direction end portion of each bag inner tether 62 is joined by a means such as stitching to the outer base cloth 54 configuring an outer circumferential face of the inflation section 20A, and another length direction end portion of each bag inner tether 62 is joined by a means such as stitching to the inner base cloth 56 configuring an inner circumferential face of the inflation section 20A. Other configuration is similar to that in the first exemplary embodiment.

In the present exemplary embodiment, stress concentrates at the three bag inner tethers 62 during inflation and deployment of the inflation section 20A. Thus, the inflation section 20A is bent at plural locations (three in this case) along the circumferential direction accompanying inflation and deployment of the inflation section 20A, and three bent sections 21 are formed in the inflation section 20A. The present exemplary embodiment obtains similar operation and advantageous effects to those in the second exemplary embodiment.

Fourth Exemplary Embodiment

Figure 11:
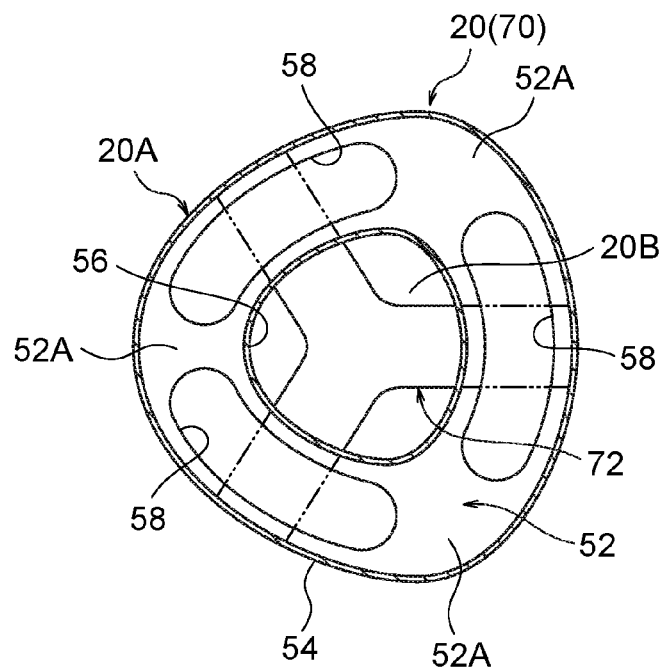
FIG. 11 is a cross-section corresponding to FIG. 8B, illustrating an airbag included in a vehicle airbag device according to a fourth exemplary embodiment of the present disclosure.

FIG. 11 is a cross-section corresponding to FIG. 8B, illustrating an inflated and deployed state of an airbag 20 included in a rear seat airbag device 70 serving as a vehicle airbag device according to the fourth exemplary embodiment of the present disclosure. In the present exemplary embodiment, two bag inner tethers 52 are provided inside the inflation section 20A of the airbag 20, similarly to in the second exemplary embodiment. Moreover, two bag outer tethers 72 (only one of which is illustrated in FIG. 11) are also provided inside the hollow section 20B of the airbag 20. The bag outer tethers 72 correspond to a "bag outer regulating member" of the present disclosure. The two bag outer tethers 72 and the two bag inner tethers 52 are installed such that their respective positions match or substantially match each other in the axial direction of the inflation section 20A.

The bag outer tethers 72 are each formed, for example, by cutting a similar cloth to the base cloths of the inflation section 20A into a substantially Y shape, and joining the three end portions thereof to the inner base cloth 56 of the inflation section 20A by a means such as stitching. The bag outer tethers 72 are thereby each coupled to an inner circumferential portion of the inflation section 20A at plural locations (three locations in this case) that are separated from each other in the circumferential direction, and are configured so as to cause the inflated and deployed inflation section 20A to bend in plural locations (three locations in this case) along the circumferential direction. Other configuration is similar to that in the second exemplary embodiment.

The present exemplary embodiment includes the bag outer tethers 72 in addition to the bag inner tethers 52 of the second exemplary embodiment, thereby enabling the inflated and deployed inflation section 20A to be more easily bent in plural locations along the circumferential direction. This makes it easier to regulate the inflated and deployed shape of the inflation section 20A to a desired polygonal tube shape.

Note that the fourth exemplary embodiment is configured including the bag inner tethers 52; however, there is no limitation thereto, and configuration may be such that the bag inner tethers 52 are omitted. The fourth exemplary embodiment is also configured such that the bag outer tethers 72 are only joined to the inner base cloth 56 of the inflation section 20A; however, there is no limitation thereto. Namely, as illustrated by the double-dotted dashed lines in FIG. 11, configuration may be such that the bag outer tethers 72 are extended to the outer base cloth 54 of the inflation section 20A and joined to the outer base cloth 54. This makes it easier to regulate the shape of an outer circumferential portion of the inflation section 20A. The fourth exemplary embodiment is also configured such that the bag inner tethers 52 and the bag outer tethers 72 are formed using separate cloths; however, there is no limitation thereto, and configuration may be such that the bag inner tethers 52 and the respective bag outer tethers 72 are integrally formed using a single cloth.

Fifth Exemplary Embodiment

Figure 12:
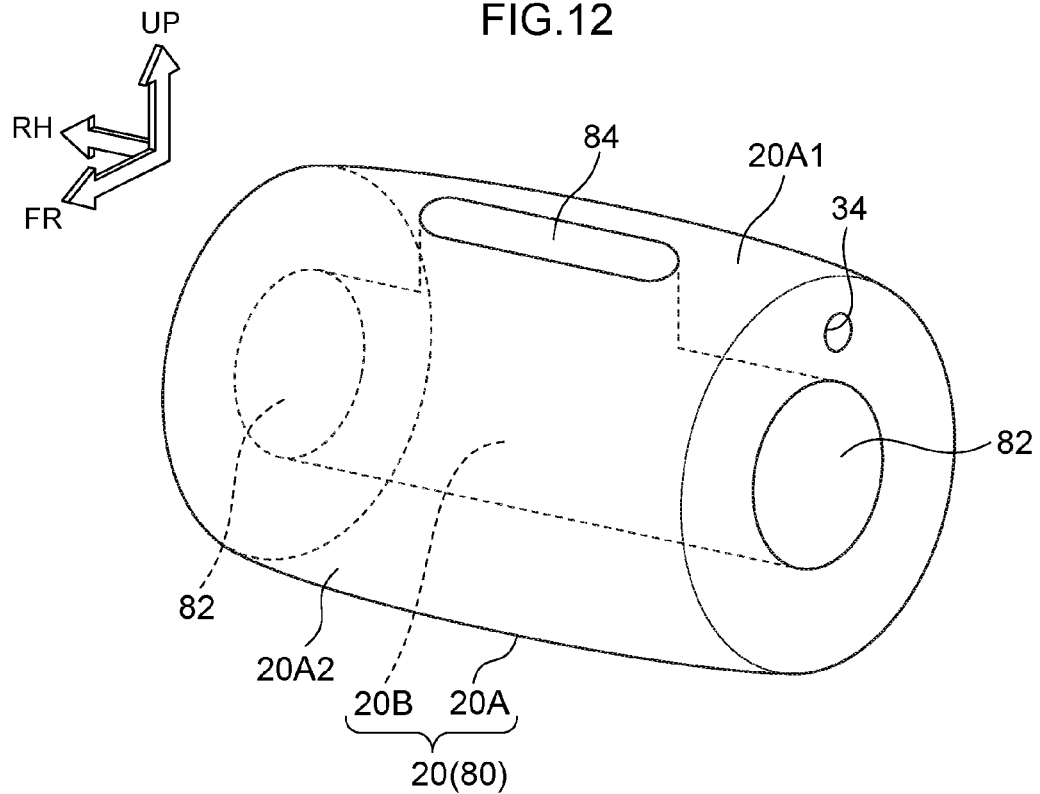
FIG. 12 is a perspective view corresponding to FIG. 3, illustrating an inflated and deployed state of an airbag included in a vehicle airbag device according to a fifth exemplary embodiment of the present disclosure.

FIG. 12 is a perspective view corresponding to FIG. 3, illustrating an inflated and deployed state of an airbag 20 included in a rear seat airbag device 80 serving as a vehicle airbag device according to a fifth exemplary embodiment of the present disclosure. Although the present exemplary embodiment has basically the same configuration as the first exemplary embodiment, in the airbag 20 of the present exemplary embodiment, the openings 20B1, 20B2 according to the first exemplary embodiment, namely, both axial direction end portions of the hollow section 20B, are respectively closed off by closed sections 82, these being part of the base cloths of the inflation section 20A. A through-hole 84 is instead formed piercing through part of the inflation section 20A (the upper portion 20A1 in this case) of the airbag 20 in the radial direction. The through-hole 84 is an elongated hole with its length along the axial direction of the inflation section 20A, and the hollow section 20B is in communication with the airbag 20 exterior through the through-hole 84. The present exemplary embodiment also exhibits basically the same operation and advantageous effects as those in the first exemplary embodiment.

Sixth Exemplary Embodiment

Figure 13:
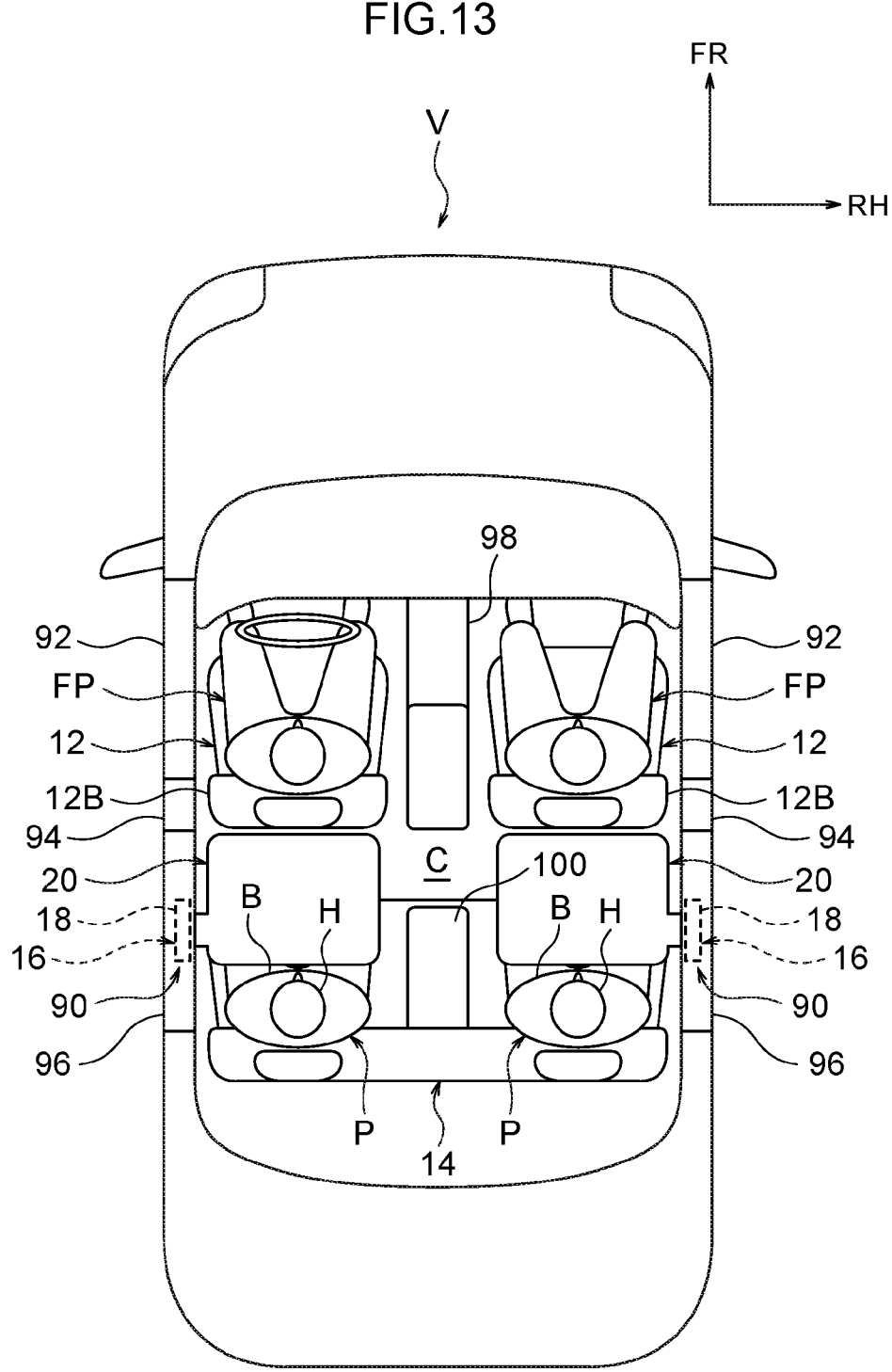
FIG. 13 is a plan view schematically illustrating a vehicle applied with vehicle airbag devices according to a sixth exemplary embodiment of the present disclosure, with the roof omitted and illustrating an inflated and deployed state of the airbags.

FIG. 13 is a plan view schematically illustrating a vehicle V applied with rear seat airbag devices 90, each serving as a vehicle airbag device according to a sixth exemplary embodiment of the present disclosure, with the roof omitted. The vehicle V according to the present exemplary embodiment includes left and right front seats 12, and left and right rear seat 14. Note that in FIG. 13, front side doors 92, center pillars 94, rear side doors 96, a center console 98, and an armrest 100 of the rear seat 14 are indicated. Occupants FP seated in the respective front seats 12 are also indicated.

The left and right pair of rear seat airbag devices 90 are installed in the vehicle V. The airbag modules 16 of the left and right rear seat airbag devices 90 are respectively installed inside the left and right rear side doors 96. Note that in FIG. 13, the airbags 20 of the left and right rear seat airbag devices 90 are respectively illustrated in inflated and deployed states. Illustration of airbag devices employed in the left and right front seats 12 is omitted from FIG. 13.

The left and right airbags 20 are normally stored in a folded state at the interior of the respective module cases 18 attached inside the left and right rear side doors 96, and are inflated and deployed toward one side in the vehicle width direction (the vehicle width direction center) on receiving gas supplied from the respective inflators 22 (not illustrated in FIG. 13). The left and right airbags 20 each include the inflation section 20A and the hollow section 20B similarly to in the first exemplary embodiment, and are each inflated and deployed in front of the upper body and above the thighs of the respective left or right rear seat occupant P seated in the rear seat 14. The inflated and deployed left and right airbags 20 are each interposed between the seatback 12B of the respective left or right front seat 12 and the upper body of the respective left or right rear seat occupant P.

In the present exemplary embodiment, each airbag 20 is inflated and deployed from the respective rear side door 96, such that the inflation and deployment direction of the airbag 20 is not greatly changed by the angle of incline of the seatback 12B, unlike cases in which the airbag 20 is inflated and deployed from the seatback 12B of the front seat 12.

Seventh Exemplary Embodiment

Figure 14:
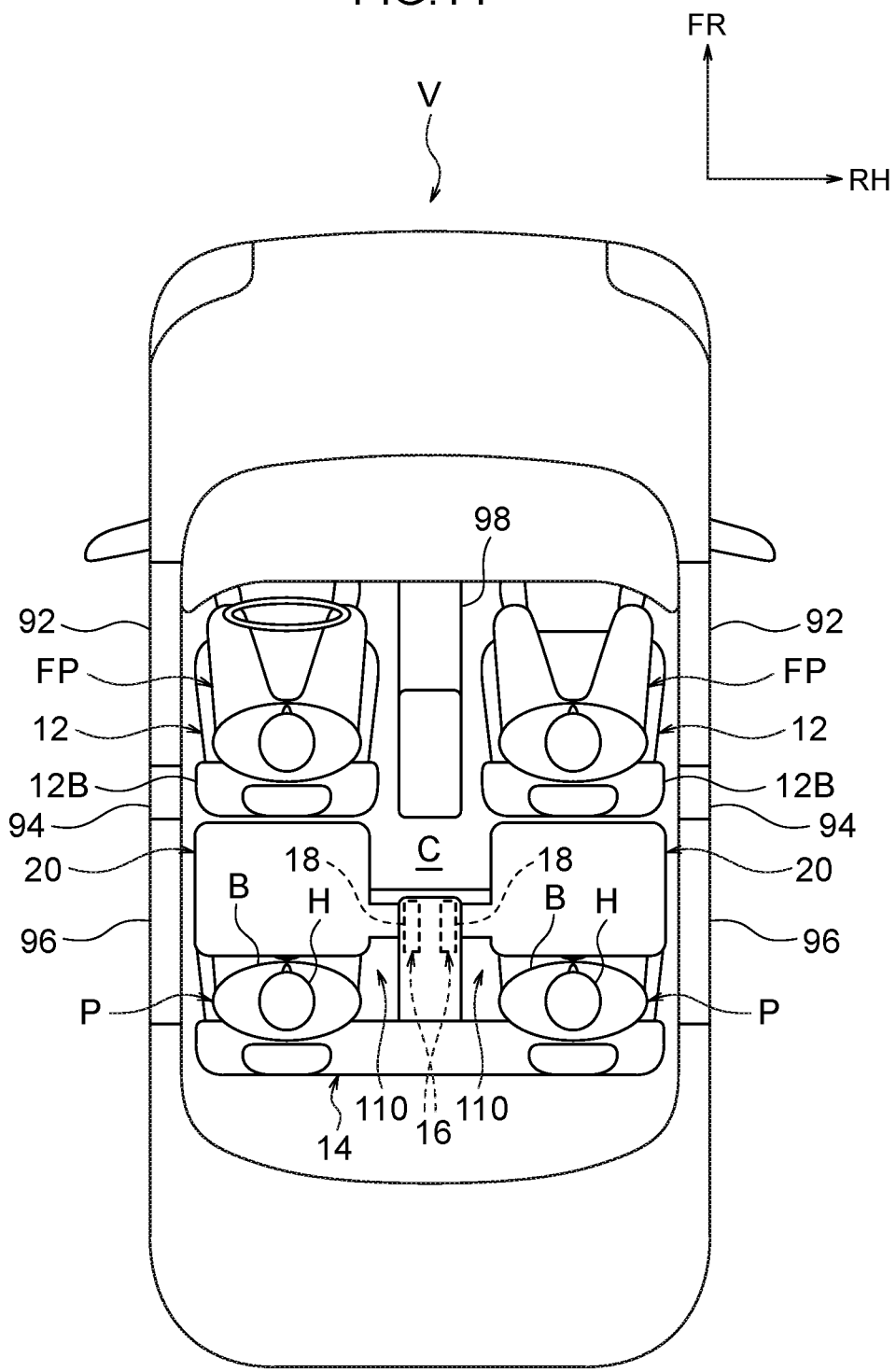
FIG. 14 is a plan view schematically illustrating a vehicle applied with vehicle airbag devices according to a seventh exemplary embodiment of the present disclosure, with the roof omitted and illustrating an inflated and deployed state of the airbags.

FIG. 14 is a plan view schematically illustrating a vehicle V applied with rear seat airbag devices 110 each serving as a vehicle airbag device according to a seventh exemplary embodiment of the present disclosure, with the roof omitted. Although the present exemplary embodiment includes the left and right pair of rear seat airbag devices 110 similarly to in the sixth exemplary embodiment, the airbag modules 16 of the left and right rear seat airbag device 110 are installed in the armrest 100 of the rear seat 14. Note that in FIG. 14, the airbags 20 of the left and right rear seat airbag devices 110 are respectively illustrated in inflated and deployed states. The left and right airbags 20 are normally stored in a folded state at the interior of the respective module cases 18 attached inside the armrest 100, and are each inflated and deployed toward one side in the vehicle width direction (a vehicle width direction outer side) on receiving gas supplied from the respective inflators 22 (not illustrated in FIG. 14). The present exemplary embodiment exhibits similar operation and advantageous effects to those in the sixth exemplary embodiment.

Eighth Exemplary Embodiment

Figure 15:
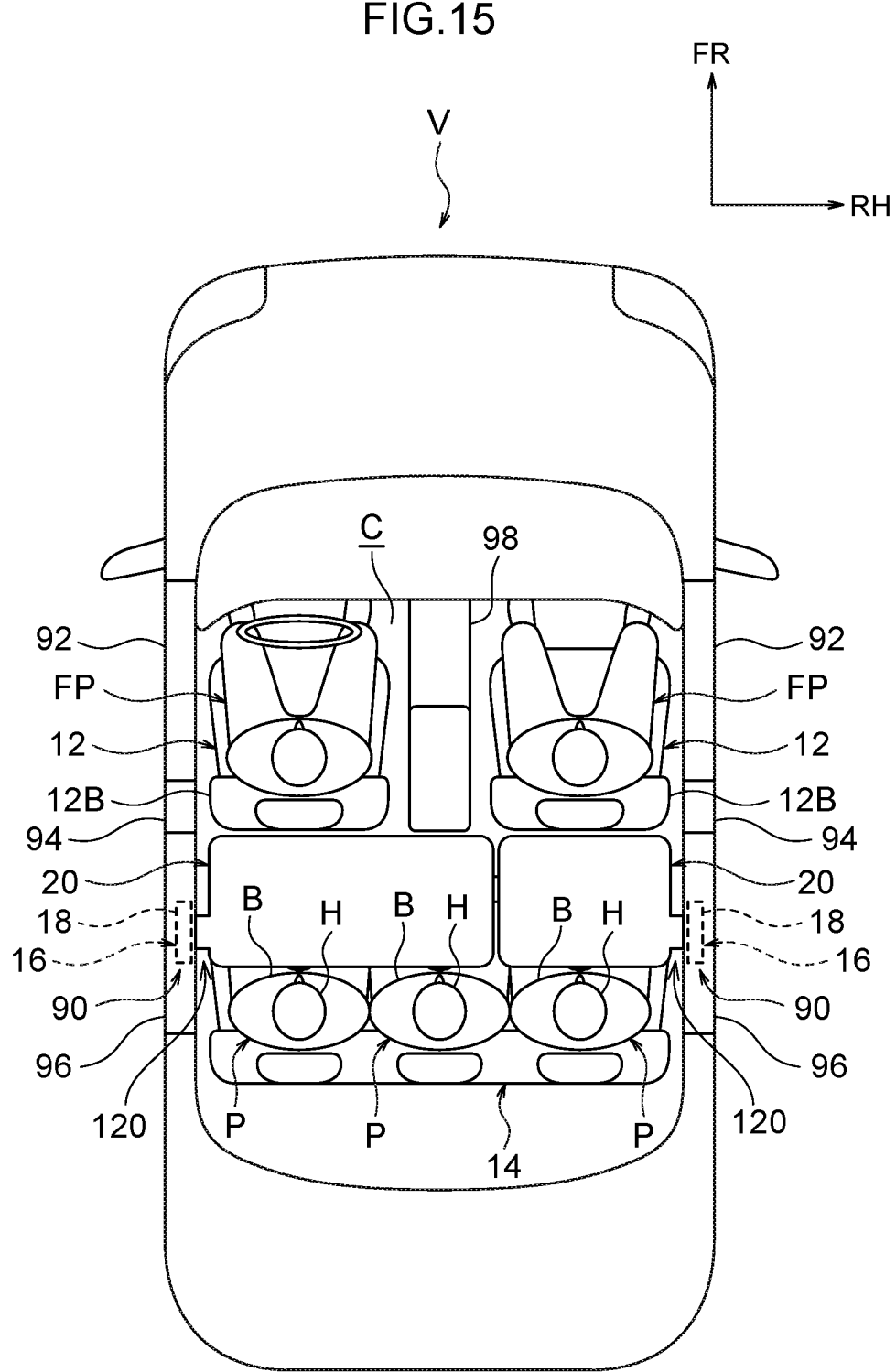
FIG. 15 is a plan view schematically illustrating a vehicle applied with a vehicle occupant restraint device according to an eighth exemplary embodiment of the present disclosure, with the roof omitted and illustrating an inflated and deployed state of airbags.

FIG. 15 is a plan view schematically illustrating a vehicle V applied with a vehicle occupant restraint device 120 according to an eighth exemplary embodiment of the present disclosure, with the roof omitted. The present exemplary embodiment has basically the same configuration as that in the sixth exemplary embodiment, and includes the left and right pair of rear seat airbag devices 90. The airbag modules 16 of the left and right rear seat airbag devices 90 are installed inside the respective left and right rear side doors 96 similarly to in the sixth exemplary embodiment, and the left and right pair of airbags 20 are inflated and deployed alongside each other in the vehicle width direction. However, in the present exemplary embodiment, one airbag of the left or right airbags 20 (the airbag 20 on the left in this case) is set with a greater dimension in the vehicle width direction in an inflated and deployed state than that of the other airbag (the airbag 20 on the right in this case). The left airbag 20 is inflated and deployed in front of the upper body and above the thighs of the rear seat occupant P seated on the left in the rear seat 14, and is also inflated and deployed in front of the upper body and above the thighs of the rear seat occupant P seated at the center in the rear seat 14.

In the present exemplary embodiment, in cases in which three occupants P are seated in the rear seat 14 in a row in the vehicle width direction as illustrated in FIG. 15, the central rear seat occupant P can be restrained by the one airbag 20 (the left airbag 20 in this case). In such cases, although there is no seatback 12B of the front seat 12 present for forming a reaction force face to the one airbag 20 in front of the central rear seat occupant P, the one airbag 20 is wedged between the upper body, and the thighs T and knees K, of the central rear seat occupant P, thereby enabling the upper body of the central rear seat occupant P to be restrained. Namely, the central rear seat occupant P is wearing a non-illustrated seatbelt that is a three-point seatbelt device, such that movement of the central rear seat occupant P toward the vehicle front side takes on a form in which the upper body tilts forward about the lumbar region W. The one airbag 20 is then wedged between the upper body that has tilted forward in this manner, and the thighs T and knees N. This enables the upper body of the central rear seat occupant P to be restrained.

Note that in each of the above exemplary embodiments, a case has been explained in which the vehicle airbag device according to the present disclosure is applied as a rear seat airbag device; however, there is no limitation thereto, and the vehicle airbag device according to the present disclosure may be applied as a front seat airbag device. Namely, even in cases in which an interior component, for forming a reaction force face to an airbag, is not present in front of a front seat in automated vehicles, for example, the upper body of an occupant in the front seat can be restrained due to the airbag according to the present disclosure being wedged between the upper body, and the thighs and knees, of the occupant. In such cases, for example, configuration is such that the airbag according to the present disclosure is stored in an armrest (such as an armrest of a center console) or a side door (front side door) positioned beside the occupant seated in the front seat.

Various other modifications may be implemented within a range not departing from the spirit of the present disclosure. Obviously the scope of rights of the present disclosure is not limited by the above exemplary embodiments.

What is claimed is:

1. A vehicle airbag device comprising:
an airbag receiving gas supplied from an inflator and being adapted to be inflated and deployed in front of an upper body and above thighs of an occupant seated in a vehicle seat;
the airbag including, in the event that the gas has been supplied inside the airbag and the airbag inflates and deploys, an inflation section having an endless annular shape as viewed along a vehicle width direction, and a hollow section formed in a central portion of the inflation section;
the hollow section being in communication with an exterior of the airbag; and
air at the exterior flowing into the hollow section during inflation and deployment.

2. The vehicle airbag device of claim 1, wherein the airbag is inflated and deployed in a tube shape including an opening at least one end of two vehicle width direction ends of the tube shape.

3. The vehicle airbag device of claim 1, wherein:
the vehicle seat is a rear seat disposed at a vehicle rear of a front seat, which is another vehicle seat; and
the airbag is adapted to be inflated and deployed between a seatback of the front seat and the upper body of the occupant.

4. The vehicle airbag device of claim 3, wherein the airbag is configured to be stored in the seatback of the front seat, and is inflated and deployed toward a vehicle rear side on being supplied with the gas.

5. The vehicle airbag device of claim 1, wherein the airbag is configured to be stored in an armrest or a side door disposed beside the occupant, and is inflated and deployed toward one side in the vehicle width direction on being supplied with the gas.

6. The vehicle airbag device of claim 1, wherein:
the airbag includes a bag inner regulating member that is provided inside the inflation section, that couples together an outer peripheral portion and an inner peripheral portion at a hollow section side of the endless annular shaped inflation section, and that causes the inflation section to bend at a plurality of locations along a circumferential direction of the inflation section accompanying inflation and deployment of the inflation section.

7. The vehicle airbag device of claim 6, wherein the bag inner regulating member runs continuously in an endless annular shape around the circumferential direction of the inflation section and includes a plurality of holes arranged in the circumferential direction of the inflation section.

8. The vehicle airbag device of claim 6, wherein a plurality of the bag inner regulating members are arranged in the vehicle width direction inside the inflation section.

9. The vehicle airbag device of claim 1, further comprising:
- a bag outer regulating member that is provided inside the hollow section, that couples a plurality of locations separated from each other in a circumferential direction at an inner peripheral portion on a hollow section side of the inflation section, and that causes the inflation section to bend at a plurality of locations along the circumferential direction of the inflation section accompanying inflation and deployment of the inflation section.

10. A vehicle occupant restraint device comprising:
- a pair of the vehicle airbag devices of claim 1;
- the airbags in the pair of vehicle airbag devices being inflated and deployed alongside each other in the vehicle width direction; and
- one airbag of the airbags being set with a larger vehicle width direction dimension in an inflated and deployed state than the other airbag.

* * * * *

UNITED STATES PATENT AND TRADEMARK OFFICE
CERTIFICATE OF CORRECTION

PATENT NO. : 10,137,853 B2
APPLICATION NO. : 15/614728
DATED : November 27, 2018
INVENTOR(S) : Jiro Ohachi and Kai Maenishi Page 1 of 1

It is certified that error appears in the above-identified patent and that said Letters Patent is hereby corrected as shown below:

On the Title Page

Item (73) Assignee:
Change "TOYOTA JIDOSHA KABUSHIKI," to -- TOYOTA JIDOSHA KABUSHIKI KAISHA --

Signed and Sealed this
Twenty-second Day of January, 2019

Andrei Iancu
*Director of the United States Patent and Trademark Office*